Figure 1:
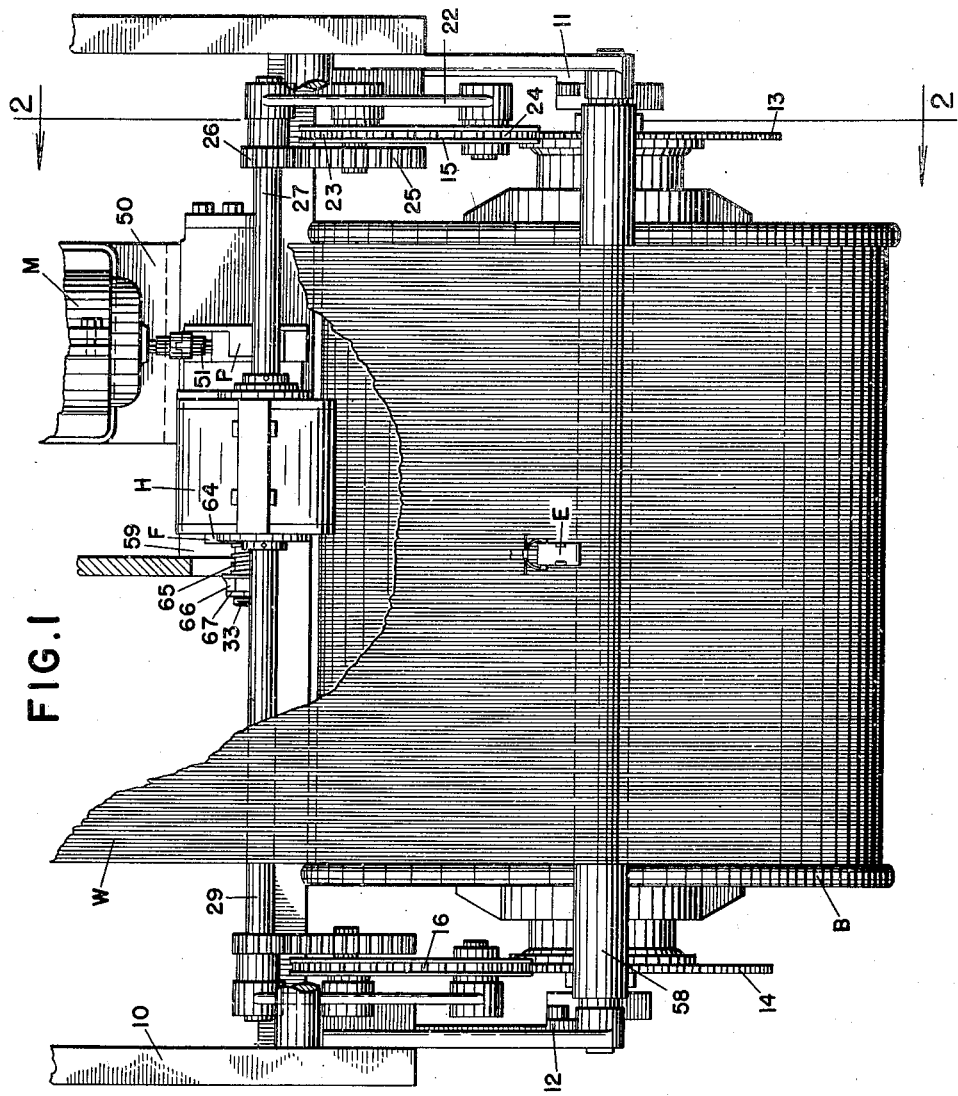

Nov. 8, 1949     C. R. KRONOFF     2,487,450
LETOFF MECHANISM FOR LOOMS
Filed April 19, 1947     3 Sheets-Sheet 1

INVENTOR
CLARENCE R. KRONOFF
Chas. T. Hawley
ATTORNEY

Nov. 8, 1949   C. R. KRONOFF   2,487,450
LETOFF MECHANISM FOR LOOMS
Filed April 19, 1947   3 Sheets-Sheet 2

INVENTOR
CLARENCE R. KRONOFF
Chas. T. Hawley
ATTORNEY

Nov. 8, 1949  C. R. KRONOFF  2,487,450
LETOFF MECHANISM FOR LOOMS
Filed April 19, 1947  3 Sheets-Sheet 3

INVENTOR
CLARENCE R. KRONOFF
Chas. T. Hawley
ATTORNEY

Patented Nov. 8, 1949

2,487,450

UNITED STATES PATENT OFFICE 2,487,450

LETOFF MECHANISM FOR LOOMS

Clarence R. Kronoff, Worcester, Mass., assignor to Crompton & Knowles Loom Works, Worcester, Mass., a corporation of Massachusetts Application April 19, 1947, Serial No. 742,510

9 Claims. (Cl. 139—110)

1

This invention relates to means for delivering warp in looms and more particularly to friction mechanism to exert equalized forces tending to resist rotation of each end of the warp beam.

In copending application Serial No. 686,294, filed by Sepavich and myself July 26, 1946, now Patent No. 2,450,489, there is shown a motor driven letoff employing differential mechanism to deliver equal driving forces to turn each end of a large warp beam. That application also shows two friction means or units resisting rotation of the beam equalized by means separate from the differential mechanism and so related to the driving mechanism for the beam and the forward pull of the takeup mechanism as to be insufficient to prevent turning of the beam when the yarn diameter is maximum but capable of preventing beam rotation when the yarn diameter is small. When the beam diameter is large the motor drive assists the friction to oppose the takeup and develop the necessary tension in the warp, but when yarn diameter is small the motor drive assists the takeup to overcome the frictional resistance.

It is an important object of my prevent invention to use a single friction unit and arrange it in such position that the differential mechanism will deliver equal counter forces resisting rotation of both ends of the beam thereby eliminating the separate equalizing means set forth in the aforesaid application.

It is a further object of the invention to provide a letoff having a differential mechanism including a force input member and a pair of force output members, and operatively relate the friction mechanism directly to the input member, thereby locating the differential mechanism operatively between the frictions means and the two ends of the beam.

It is another object of the invention to provide a letoff having a differential mechanism including a force input member formed with a shaft, having oppositely extending parts, and operatively relate a motor drive for the beam to one end of the shaft and operatively relate the friction means to the opposite end of the shaft. In this way both the motor drive and the friction means are readily accessible and either of them can be disconnected from the differential mechanism if desired.

With these and other objects in view which will appear as the description proceeds, my invention resides in the combination and arrangement of parts hereinafter described and set forth.

In the accompanying drawings, wherein a convenient embodiment of my invention is set forth, Fig. 1 is a plan view showing a warp beam and part of a loom with my invention applied thereto.

Figure 2:
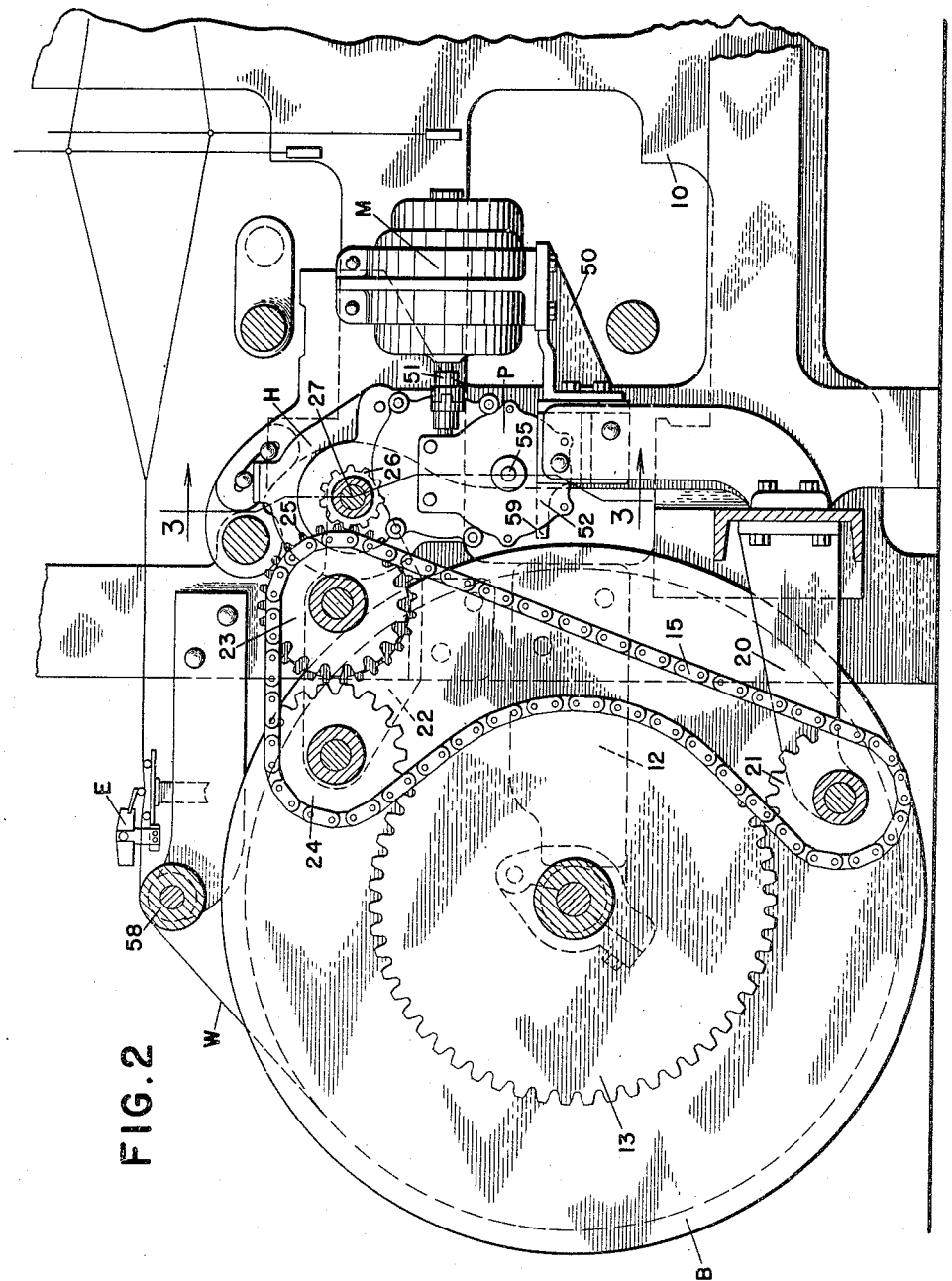

Fig. 2 is a vertical section on line 2—2 of Fig. 1,

2

Figure 3:
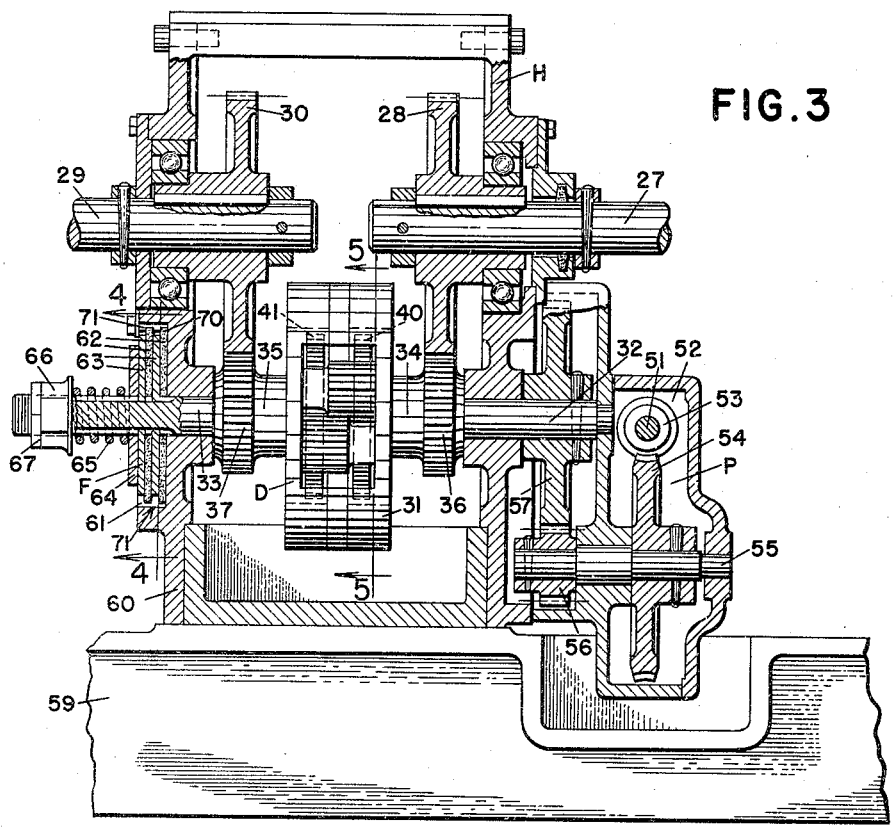

Fig. 3 is an enlarged vertical section on line 3—3 of Fig. 2, and

Figure 4:
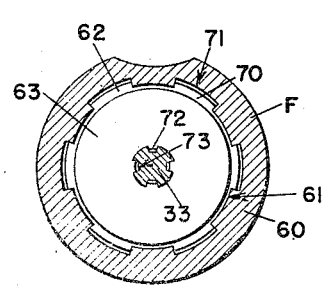
Figure 5:
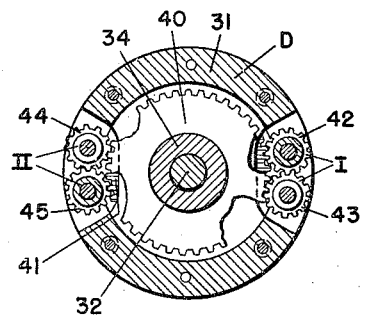

Figs. 4 and 5 are vertical sections on lines 4—4 and 5—5, respectively, of Fig. 3.

Referring particularly to Figs. 1 and 2, the loom frame 10 has extending rearwardly therefrom right and left support arms 11 and 12, as viewed in Fig. 1, which rotatably support a warp beam B having a supply of warp W wound thereon. The warp beam has sprocket wheels 13 and 14 secured to the right and left ends thereof, and these wheels mesh with driving chains 15 and 16, respectively. Each of these chains is mounted as shown in Fig. 2 and is so disposed as to mesh with the front part of a sprocket wheel. The chain and parts associated with it are the same for both sides of the loom, and a description of the parts at the right end of the loom as shown in Fig. 2 will suffice for both ends.

A stand 20 extends rearwardly from the loom frame and has mounted thereon an idler sprocket 21 around which the lower part of chain 15 is trained. An upper stand 22 fixed to the loom frame has front and back sprocket wheels 23 and 24, respectively, see Fig. 2, around which the upper part of chain 15 is trained. Sprocket 23 is fast with respect to a gear 25 meshing with a pinion 26 secured to a shaft 27. The latter is suitably journaled and extends into a housing H which may be located intermediate the sides of the loom and forward of the beam as indicated in Fig. 1. As shown in Fig. 3 shaft 27 has splined thereto a gear 28 by which forces for both driving and retarding movement of the shaft can be transmitted to the latter. A left shaft 29 similar to shaft 27 but for the chain 16 also enters housing H and has secured thereto a gear 30 similar to gear 28.

The differential or planetary gear mechanism designated generally at D is supported in housing H and includes an input member 31 to which is secured right and left aligned shafts 32 and 33, respectively, see Fig. 3. Shafts 32 and 33 are coaxial and in effect constitute a single shaft for member 31. Journaled for free rotation on the shafts 32 and 33 are force output members 34 and 35, respectively. Member 34 has a pinion 36 meshing with gear 28, while member 35 has another gear 37 meshing with gear 30.

Output member 34 has rigid therewith a solar gear 40 and member 35 is fixed to a similar solar gear 41. These gears 40 and 41 mesh with planet pinions carried by the input member 31. There are two pairs I and II of these pinions, and the pinions of each pair mesh with each other. One member of each pair of pinions meshes with gear 40 while the other member meshes with gear 41, as indicated in Fig. 3. As shown in Fig. 5 pinions 42 and 43 constitute pair I and pinions 44 and 45 constitute the other pair II.

An electric motor M shown in Figs. 1 and 2 is provided for a warp beam power driving unit P. Motor M is mounted on a stationary support 50 and has a shaft 51 which extends to a gear reducing unit 52 including a worm 53 secured to the motor shaft and a worm wheel 54 secured to a shaft 55. The latter is mounted on part of housing H and has secured thereto a pinion 56 meshing with a gear 57 secured to shaft 32.

The motor operates intermittently by means of electric connections not shown herein but controlled by warp tension regulated indicator E. It is thought sufficient for present purposes to state that when warp tension reaches or exceeds a desired maximum motor M will run and cause turning of input member 31, but when the tension has been reduced to a desired minimum the motor will stop.

The loom may operate with a stationary whip roll 58 over which the warp W extends as it leaves the warp beam and is moved forwardly by the weaving instrumentalities of the loom, and a stationary support 59 may be provided for the housing H.

When the motor is running the input member 31 receives a driving force which is divided equally by the differential mechanism D into two equal forces which are delivered to the two gears 28 and 30 and shafts 27 and 29 to cause the chains at the opposite ends of the warp beam to turn the ends of the latter at the same rate.

The mechanism thus far described is substantially the same as set forth in the aforesaid copending application.

In carrying my present invention into effect I provide a friction unit or means which is operatively connected to the differential mechanism in such a manner as to offer substantially equal counter forces to the ends of the beam tending to resist rotation of the latter and therefore enable the desired tension to be developed in the warp. This mechanism is designated generally at F and acts directly on input member 31 of mechanism D. The left side plate 60 of housing H is recessed as at 61 to receive a set of friction plates disposed around shaft 33. As shown herein four friction plates are used, two of them, indicated at 62, being stationary and preferably made of friction material and the other two, indicated at 63, being rotary and movable with shaft 33 and preferably though not necessarily made of metal. Plates 63 turn in planes parallel to the plane in which the input member turns, and are rotatable by the latter when it turns. A pressure plate 64 is pushed against the outermost disk by a compression spring 65 which engages a nut 66 adjustable along the left end of shaft 33 as viewed in Fig. 3. A lock nut 67 holds the setting of nut 66 on shaft 33.

The friction disks 62 are held against rotation by having lugs or extensions 70 thereof received by slots 71 in side plate 60 and communicating with recess 61. The disks 63 have lugs or extensions 72 received by slots 73 cut lengthwise in shaft 33. The spring 65 normally causes the stationary disks to resist turning of the rotary disks 63 to retard movement of shaft 33 and force input member 31. By varying the position of the nut 66 the amount of frictional resistance offered by mechanism F can be varied.

When the warp beam tends to turn in a forward direction due either to the pull of the takeup mechanism not shown or the beat-up of the lay not shown, the mechanism F will resist turning of the beam, thereby enabling warp tension of the desired amount to be developed in the warp threads. Because of the differential mechanism D the resisting or counter force originating in mechanism F and transmitted by input member 31 is divided into two equal parts which are delivered to the force output members and applied to the ends of the beam through shafts 27 and 29 and parts associated therewith. A single friction mechanism therefore suffices to offer equal resistances to movement of both ends of the warp beam.

From the foregoing it will be seen that I have provided a letoff mechanism for a loom employing a single friction means operating in conjunction with the differential mechanism in such manner that the frictional counter force is divided into two equal forces which are exerted on the opposite ends of the beam. The friction is provided by a single means or unit which directly resists movement of the force input member 31. It will also be seen that the friction unit F and the motor mechanism P operate on the same differential mechanism and the same train of parts can be used either for advancing the beam positively by a force derived from the motor or for resisting rotation of the beam by counter forces derived from the friction means. Furthermore, the motor driving parts are on one side of the differential mechanism while the friction means is on the opposite side, as shown in Fig. 3, and if it should be desired for any reason to relieve or entirely nullify the effect of mechanism F this can be done readily by loosening a nut 66 without disturbing the motor driven part of the mechanism. In similar manner, if it should be desired to operate the letoff by friction means alone one or another of the gears of mechanism P can be disconnected. In either of these instances the differential mechanism will still be operatively interposed between the two ends of the warp beam and whichever of the mechanisms F or P is utilized to control rotation of the beam.

Having thus described my invention it will be seen that changes and modifications may be made therein by those skilled in the art without departing from the spirit and scope of the invention and I do not wish to be limited to the details herein disclosed, but what I claim is:

1. In a loom having a warp beam rotatable to deliver warp, a geared means connected to each end of the beam controlling turning thereof, differential mechanism including a rotary force input member and two force output members, connections between the latter and said geared means, and rotary friction means turning in a plane parallel to the plane in which the input member turns and acting directly on said input member resisting rotation thereof.

2. In a loom having a warp beam rotatable to deliver warp, gearing for each end of the beam moving when the latter turns but capable when movement thereof is resisted of resisting turning of the beam, a differential mechanism including a rotary input member and two rotary output members, connections between each output member and the corresponding gearing, and rotary friction means turning in a plane parallel to the plane in which the input member turns and directly resisting turning of the rotary input member, said differential mechanism effective to transmit substantially equal motion resisting forces from said friction means to each gearing to enable said gearings to exert substantially equal forces resisting turning of their respective ends of the beam.

3. In a loom having a warp beam rotatable to deliver warp, a sprocket wheel on each end of the beam, a chain meshing with each sprocket, a shaft operatively connected to each chain, a differential mechanism including an input member and a pair of output members operatively connected to said shafts, and rotary friction means turning in a plane parallel to the plane in which the input member turns and directly resisting rotation of said input member and providing a counter force which is divided into two equal parts by the differential mechanism for delivery to said output members and from the latter through said shafts and chains to the ends of the warp beam.

4. In a loom having a warp beam rotatable to deliver warp, two shafts operatively connected one to each end of the beam, a housing supporting adjacent ends of said shafts, a differential mechanism within said housing having a force input member including two solar gears and two force output members, each of the latter being operatively connected to the corresponding shaft, and rotary friction means supported by said housing and acting directly on said solar gears and rotatable by the latter to resist rotation thereof, said differential mechanism effective to deliver two substantially equal counter forces derived from said friction means to said shafts enabling the latter to exert equal forces resisting rotation of the ends of the shaft.

5. In a loom having a warp beam rotatable to deliver warp, a pair of shafts operatively connected to the beam, one shaft for each end of the beam, a housing supporting adjacent ends of said shafts, a differential mechanism in the housing having a rotary force input member and a pair of force output members, driving connections between each output member and the corresponding shaft, and a rotary friction unit turning in a plane parallel to the plane in which the input member turns and acting directly on the force input member tending to resist movement thereof and bearing against said housing, said differential mechanism receiving a counter force from said friction unit through the input member and dividing said counter force into two equal parts delivered to said output members to enable the latter and the shafts corresponding thereto to oppose rotation of the ends of the beam by substantially equal forces.

6. In a loom having a warp beam rotatable to deliver warp, driving gearing for each end of the beam, an electric motor having active and inactive periods controlled by warp tension, differential mechanism including a rotary force input member and having two force output members operatively connected to said gearings, operative connections between the motor and input member including a worm driven by the motor and a worm wheel meshing with the worm and operatively connected to said input member, and friction means acting directly on said input member independently of said worm and worm wheel resisting rotation of said input member, said differential mechanism being effective to deliver equal forces derived from the motor to both of said driving means causing the latter to turn both ends of the beam when the motor is active, and said differential mechanism also resisting movement of both of said driving gearings by equal counter forces derived from said friction means whether the motor is active or inactive.

7. In a loom having a worp beam rotatable to deliver warp, the warp exerting forces on the beam tending to rotate the latter, a gearing for each end of the beam controlling rotation of the latter, an actuator having periods of action and inaction depending upon variations in warp tension, differential mechanism including a rotary force input member operatively connected to said actuator and having a pair of force output members operatively connected to said gearings, and rotary friction means turning in a plane parallel to the plane in which the input member turns and directly engaging and resisting rotation of the input member, said differential mechanism effective when the actuator is active to deliver substantially equal forces derived from said actuator to both of said gearings, and said differential effective during periods of action and inaction of the actuator to exert substantially equal counter forces derived from said friction means against said gearings causing the latter to exert equal forces on the ends of the beam tending to resist turning thereof.

8. In a loom having a warp beam rotatable to deliver warp, geared means connected to each end of the warp beam, a support housing, differential mechanism in said housing including a rotary force input member having a shaft rotatable on the housing and having also two force output members, connections between each force output member and the geared means corresponding thereto, an actuator connected to one end of said shaft, and rotary friction means turning in a plane parallel to the plane in which the input member turns and operatively connected to the other end of the shaft, said input member when receiving a driving force from the actuator applied to said one end of the shaft causing the differential mechanism to deliver substantially equal driving forces to said output members, and said friction means when opposing movement of the other end of said shaft causing the differential mechanism to exert substantially equal counter forces resisting rotation of said output members.

9. In a loom having a warp beam rotatable to deliver warp, geared means operatively connected to each end of the beam, differential mechanism having a force input member including two solar gears and two force output members, force transmitting connections between each output member and the corresponding geared means, actuator means connected to the force input member to effect rotation of the beam by equal forces delivered to the ends thereof and transmitted through said output members, and rotary friction means connected to said solar gears and rotatable by the latter and exerting equal counter forces resisting rotation of both ends of said beams and transmitted through said output members.

CLARENCE R. KRONOFF.

REFERENCES CITED

The following references are of record in the file of this patent:

UNITED STATES PATENTS

| Number | Name | Date |
| --- | --- | --- |
| 775,336 | Meats | Nov. 22, 1905 |
| 807,721 | Carver | Dec. 19, 1905 |
| 858,138 | Atkins | June 25, 1907 |
| 1,548,993 | Harris | Aug. 11, 1925 |
| 1,691,884 | Hucks | Nov. 13, 1928 |
| 1,703,884 | Hutchins | Mar. 5, 1929 |
| 1,749,131 | Davis | Mar. 4, 1930 |
| 1,953,510 | Schultz et al. | Apr. 3, 1934 |
| 2,169,326 | Payne | Aug. 15, 1939 |